April 20, 1954  A. W. EBER  2,675,753
APPARATUS FOR MAKING LINK SAUSAGES
Filed Nov. 21, 1951  2 Sheets-Sheet 1
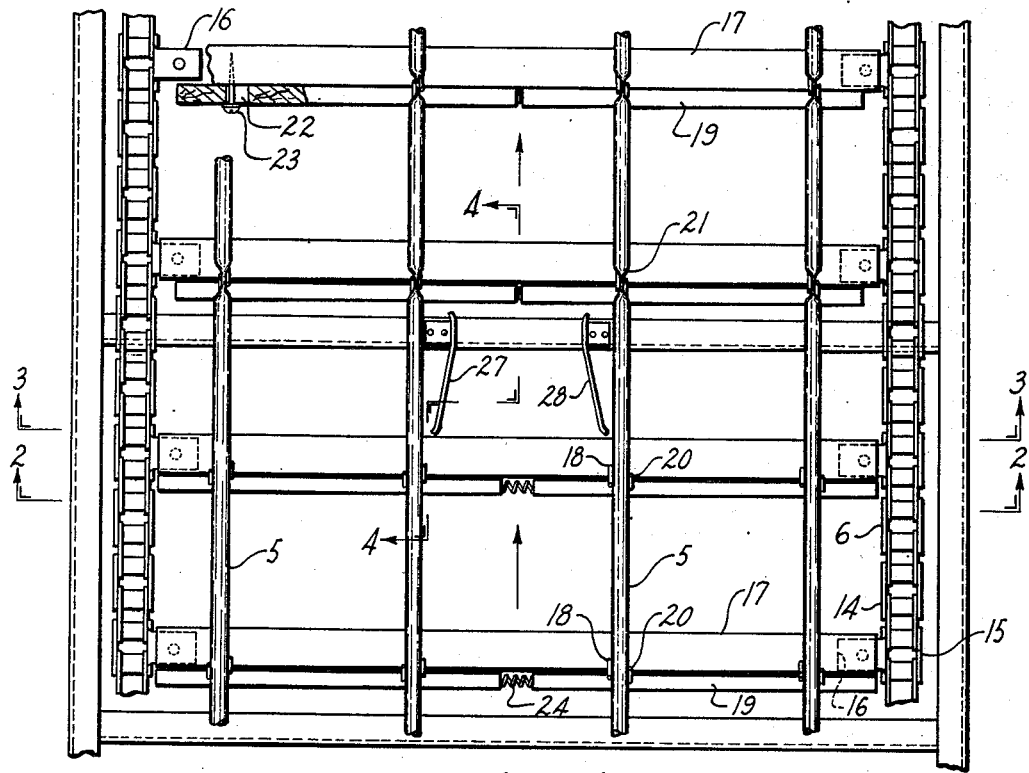
Fig. 1
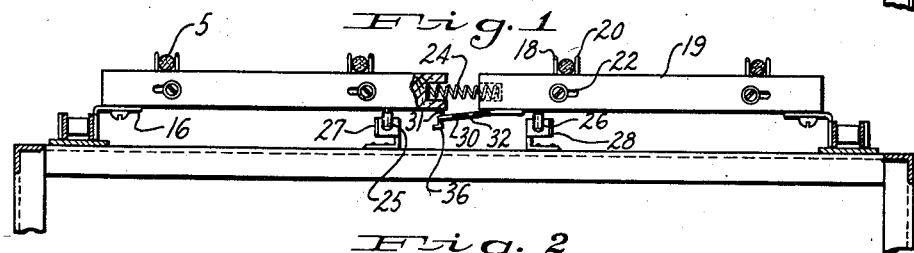
Fig. 2
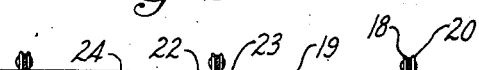
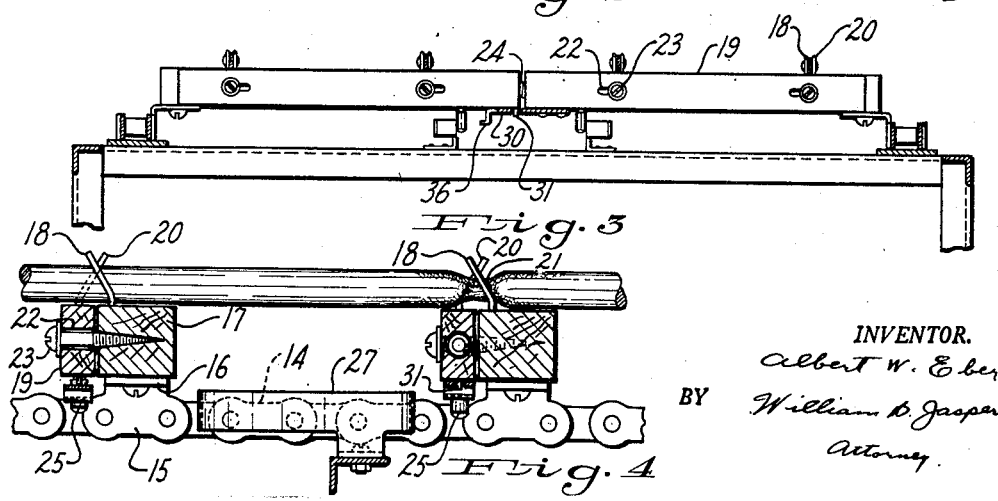
Fig. 4
INVENTOR.
Albert W. Eber
BY William D. Jaspert
Attorney.

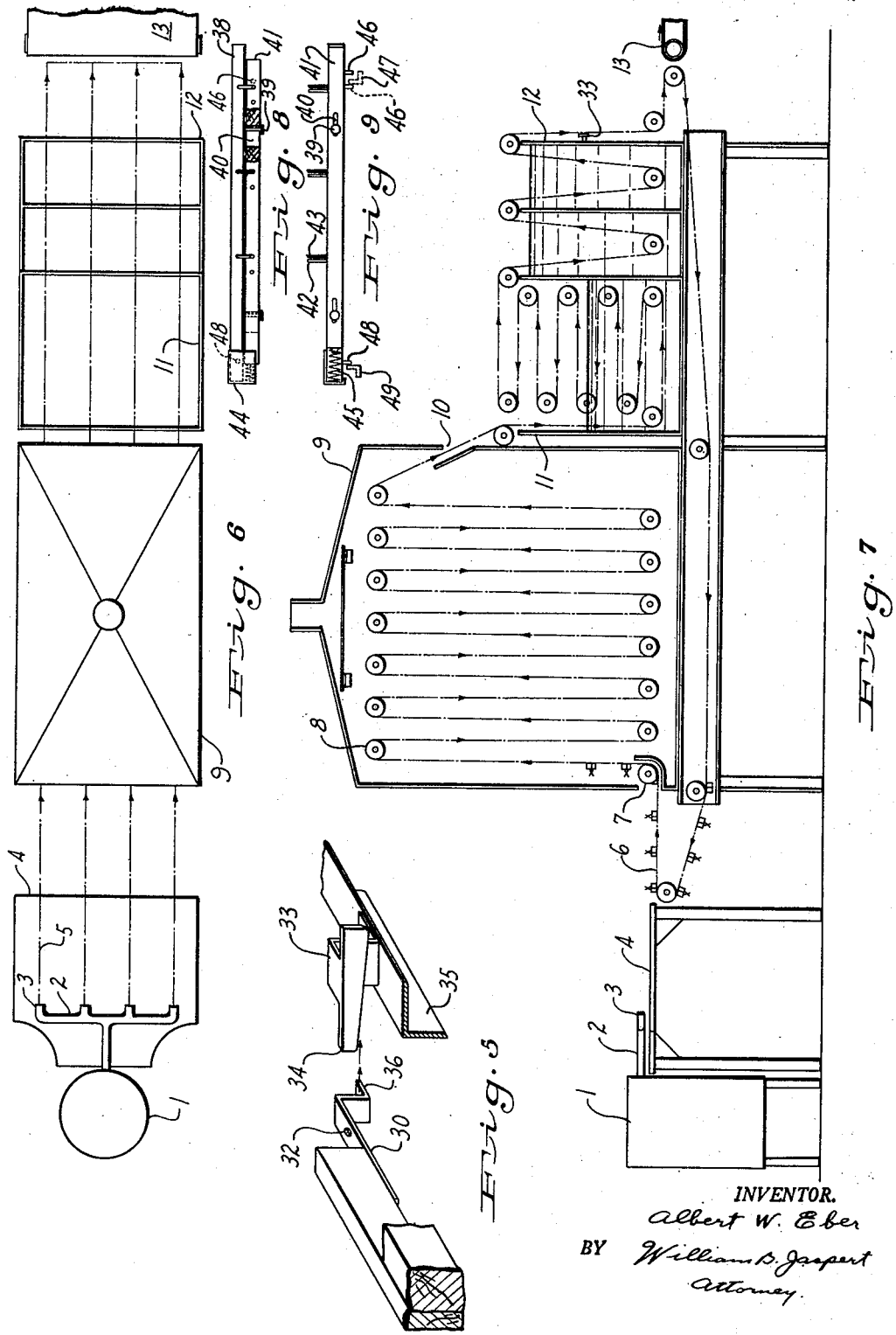

Patented Apr. 20, 1954

2,675,753

UNITED STATES PATENT OFFICE 2,675,753

APPARATUS FOR MAKING LINK SAUSAGES

Albert W. Eber, Pittsburgh, Pa.

Application November 21, 1951, Serial No. 257,535

5 Claims. (Cl. 99—261)

This invention relates to new and useful improvements in apparatus for making link sausages, and more particularly to means for linking and conveying relatively long lengths of sausage material whereby they may be linked and processed in a continuous and uninterrupted manner.

The invention will become more apparent from a consideration of the accompanying drawings, constituting a part hereof, in which like reference characters designate like parts, and in which Fig. 1 is a top plan view of an endless conveying mechanism for linking and conveying sausages, embodying the principles of this invention;

Fig. 2 is a transverse view, partly in section and partially in elevation, taken along the line 2—2 of Fig. 1;

Fig. 3 is a similar view taken along the line 3—3 of Fig. 1;

Fig. 4 is a cross-sectional view, partially in elevation, of a portion of the conveying and linking mechanism, taken along the line 4—4, Fig. 1;

Fig. 5 is an isometric view of a portion of the conveying mechanism for actuating the sausage linking device;

Fig. 6 is a top plan view diagrammatically illustrating the sausage stuffing, conveying and treating apparatus;

Fig. 7 is a front elevational view of the arrangement shown in Fig. 6; and

Figs. 8 and 9 are a top plan, partially in section, and a side elevational view, respectively, of a modified form of linking bars for engaging the sausage casings.

With reference to Figs. 6 and 7 of the drawings, the numeral 1 designates a sausage extruding machine for stuffing sausage meat in casing through a manifold 2 having nozzles 3 to which the casing is attached for receiving the extruded product. The links of the stuffed casings pass along a table 4 as shown by the dot and dash lines 5, there being four links of sausage illustrated in Fig. 6 of the drawings. The end of the stuffed casings of sausage then pass on to a conveyor mechanism, generally designated by the numeral 6, which will be described in more detail in connection with the remaining figures of the drawings. The conveyor 6 passes around guide sprocket wheels 7 and 8 through a smokehouse 9 in which the sausage is cured and smoked, and it then passes through an opening 10 into a cooking tank 11 and then into a rinsing tank 12, after which it is placed on a conveyor 13 for delivery to a packing station.

As shown in Figs. 1 to 4 of the drawings, the straight stuffed casings of sausage meat 5 pass onto the conveyor 6 which, as shown in Figs. 1 and 4, consists of links 14 and 15, the links 15 having flanges 16 for receiving cross bars 17 that carry a series of crimping fingers 18. The cross bars 17 are fixed on the flanges 16 of the links 15 and movable cross bars 19 are mounted on the cross bars 17, the movable cross bars carrying crimping fingers 20 that cooperate with the fingers 18 to crimp the sausages as shown at 21.

The cross bars 19 are provided with slots 22 for receiving body-milled screws 23 that extend into the cross bars 17 as shown in Fig. 4. The cross bars 19 are split members that are separated by coil springs 24 to normally keep the crimping fingers 18 and 20 separated for receiving the stuffed sausage, as shown in Fig. 1. The split members 19 are provided with pins 25 and 26 that are disposed in the path of travel of guide brackets 27 and 28, respectively, as shown in Figs. 1 and 2. When the pins 25 strike the guide brackets the split members 19 are forced together against the action of the springs 24 and by this movement the crimping fingers 18 and 20 cross each other in the manner shown in Figs. 1, 3 and 4, to crimp the sausage at 21.

For the purpose of maintaining the split cross bars 19 in crimping position, they are provided with latches 30 and latch pins 31. As is shown in Fig. 2, the latch 30 is attached to one of the split members 19 and the pin 31 to the other. As the split members 19 are brought together by pins 25 and 26 engaging guide brackets 27 and 28, the latch 30 strikes pin 31 and is deflected downwardly until the pin registers with the opening 32, when it will snap into position as shown in Fig. 3, locking the split members 19 in their contracted or closed position. In this manner the sausage crimps 21 are maintained during their course of travel through the smokehouse 9 and the cooking and rinsing tanks 11 and 12, after which the crimping fingers 18 and 20 may be separated, because the sausage meat after curing has acquired a permanent set to divide the sausage in links.

After the cross bars 17 and 19 have passed out of the rinsing tank 12, they travel past a latch disengaging element generally designated by the numeral 33, Fig. 7, and which is shown in detail in Fig. 5 of the drawings. It consists of a web-shaped bracket 34 that may be mounted on an angle bar 35 and is disposed in the path of travel of the latch 30 which is provided with an L-shaped end 36. The latter is engaged by the web-shaped finger 34 and is displaced downwardly a sufficient distance to release pin 31 from the opening 32 of latch 30. When this is accomplished the spring 24 immediately separates the split cross bar 19 and causes the fingers 18 and 20 to separate. The linked sausage is then free of the crimping fingers and is delivered to the conveyor 13 as previously described.

In Figs. 8 and 9 of the drawing, a cross bar 38 fixed to the conveyor links is provided with pins 39 that operate in slots 40 of a movable cross bar 41, the bars 38 and 41 being provided with crimping fingers 42 and 43 for engaging the sausage casing therebetween, the same as the fingers 18 and 20 as shown in Fig. 3 of the drawings. The stationary bars 38 are provided with brackets 44 for retaining a coil spring 45 that abuts the end of the bracket 44 and the end of the movable cross bar 41 as shown in Fig. 9. Spring 45 normally biases the movable cross bar 41 to the position shown in Fig. 9 where the crimping fingers 42 and 43 are closed or unclosed.

For a portion of the travel of the cross bars at the end of the sausage stuffing table 4, as shown in Figure 7, the crimping fingers 42 and 43 are separated by means of a guide pin 46 attached to the movable bar 41 that engages a guide bracket 47 in the path of travel of the pin, and a similar pin 48 is attached to the fixed cross bar 38 to hold it against displacement when the pin acts against the guide 47. A guide 49 is provided in the path of travel of pin 48 for the duration of contact of pin 46 with the displacement bracket 47. When the sausage casings have been located on the cross bars of the conveying mechanism with the crimping fingers 42 and 43 in open position, the cross bars pass the ends of the guides 47 and 49 and the spring 45 yieldingly urges the movable cross bar 41 to the closing position of fingers 42 and 43, thus crimping the sausage casing and holding the same during the remainder of the processing while passing through the smokehouse 9 and the treating tanks 11 and 12.

It is evident from the foregoing description of my invention that it provides a simple and efficient means of making smoked sausage, such as wieners, by a continuous process within a minimum amount of space such as is needed in conventional practice of loading the meats on racks and placing them in tanks.

While it is recognized that the linking of sausage casings by mechanical means without the use of tie strings is not new, the use of clamping means for linking sausages while moving on an endless conveyor is deemed novel. The conveying method lends itself to the utilization of a minimum amount of space because the endless conveying means may be multiplied sufficiently to subject the product to the necessary time and temperature treatments both in the smokehouse, cooking and rinsing compartments, to make the operation continuous without the need for intermittent handling of the product or supporting racks.

Although one embodiment of the invention has been herein illustrated and described, it will be evident to those skilled in the art that various modifications may be made in the details of construction without departing from the principles herein set forth.

I claim:

1. In a sausage linking and treating apparatus, an endless conveyor having fixed and movable cross bars mounted in pairs transversely of the conveyor, said cross bars having spaced gripping fingers for engaging stuffed sausage casings therebetween to crimp and hold said casings in the form of links, means in the path of movement of said conveyor for actuating said cross bars to move said fingers to gripping engagement, latching means for locking said bars in closed position of the fingers, and means in the path of travel of said conveyor for unlatching said locking means.

2. In a sausage linking and treating apparatus, an endless conveyor having strands passing over guide pulleys in a treating chamber, fixed cross bars having their ends secured to the conveyor strands extending transversely to the direction of movement of said strands and spaced at intervals the full length of the strands, movable cross bars slidingly mounted on the fixed cross bars, said fixed and movable cross bars having crimping fingers mounted in cooperative relation to receive a stuffed sausage casing therebetween, means in the path of travel of said movable cross bar for actuating the same to displace the movable bar in the direction to effect crimping engagement with the fingers of the fixed cross bar, latching means for locking said movable bars in their displaced position during the travel of the linked sausage through the treating chambers, and means in the path of movement of said cross bars for unlatching said movable bars when the product has become rigid and fixed by treatment to maintain the link shape of the sausage casing.

3. In a sasusage linking and treating apparatus, an endless conveyor having strands passing over guide pulleys, fixed cross bars having their ends secured to the conveyor strands extending transversely to the direction of movement of said strands and spaced at intervals the full length of the strands, a plurality of movable members attached to said cross bars having slotted engagement therewith, spring means separating said movable members, said cross bars and movable members carrying crimping fingers for engaging the sausage casing therebetween to crimp the same in the shape of spaced links and to firmly hold the product while passing through the conveying system, said movable members having pins and guide brackets in the path of travel of said pins for contracting the movable members against the action of the separating springs, and means for latching the movable members in their closed position.

4. In a sausage linking and treating apparatus, an endless conveyor having strands passing over guide pulleys, fixed cross bars having their ends secured to the conveyor strands extending transversely to the direction of movement of said strands and spaced at intervals the full length of the strands, a plurality of movable racks mounted on and attached to said cross bars and having slotted engagement therewith, spring means separating said racks, said cross bars and racks carrying crimping fingers for engaging the sausage casing therebetween to crimp the same in the shape of spaced links and to firmly hold the product while passing through the conveying system, said racks having pins and guide brackets in the path of travel of said pins for contracting the racks against the action of the separating springs, and means for latching the racks in their closed position, said means comprising latches secured to one of the racks for engagement with interlocking means on the adjacent racks to snap in position when the racks are closed against the action of the spring, and means in the path of movement of the conveyor for disengaging said latching means to effect separation of the racks to separate the crimping fingers.

5. In a sausage linking and treating apparatus, an endless conveyor, cross bars secured to the conveyor strands extending transversely to the direction of movement of said strands and spaced at intervals the full length of the strands, a plurality of movable racks attached to said cross bars having slotted engagement therewith, spring means for actuating said movable racks, said cross bars and movable racks carrying crimping fingers for engaging the sausage casing therebetween to crimp the same in the shape of spaced links and to firmly hold the product while passing through the conveying system, guide brackets in the path of travel of the conveyor, and means on said movable racks for engaging said guide brackets to actuate the same against the action of the spring.

References Cited in the file of this patent
UNITED STATES PATENTS

| Number | Name | Date |
| --- | --- | --- |
| 1,590,167 | Howard | June 22, 1926 |
| 2,232,207 | Carroll | Feb. 18, 1941 |
| 2,258,717 | Read | Oct. 14, 1941 |
| 2,264,305 | Gibbs | Dec. 2, 1941 |